(No Model.)
H. G. CHENEY.
APPARATUS FOR MAINTAINING THE TEMPERATURE OF LIQUIDS.
No. 453,422. Patented June 2, 1891.
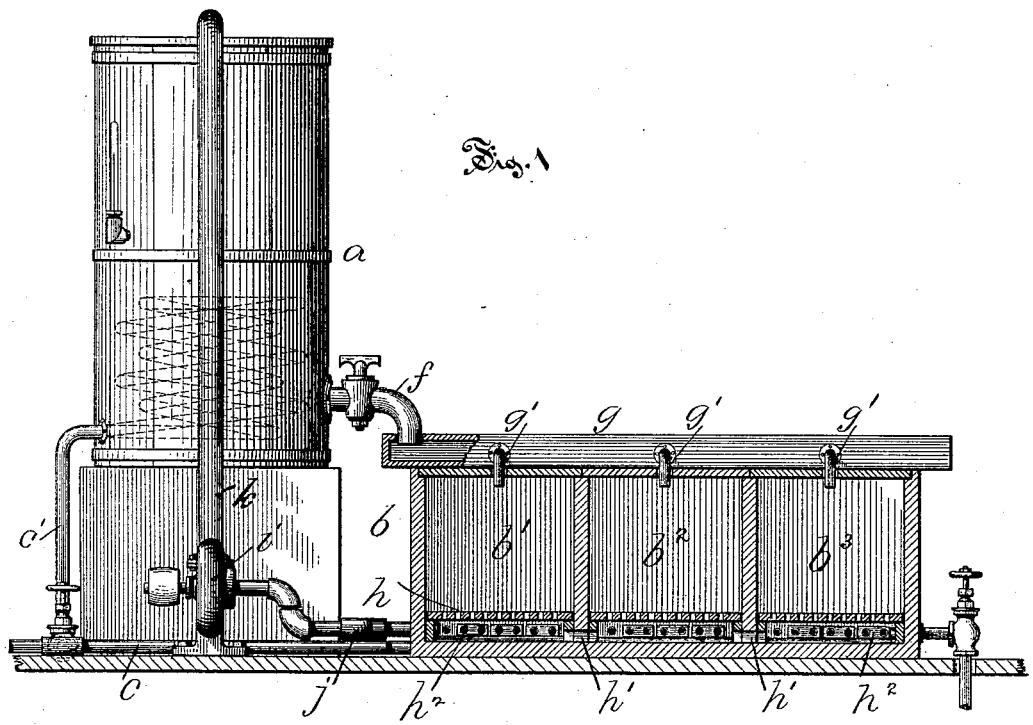
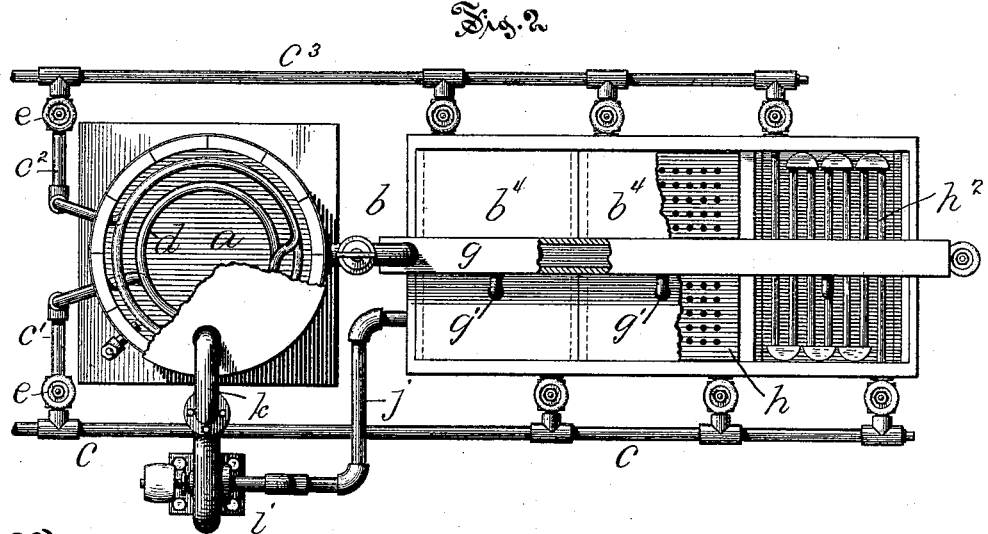

UNITED STATES PATENT OFFICE.

HARRY G. CHENEY, OF SOUTH MANCHESTER, CONNECTICUT.

APPARATUS FOR MAINTAINING THE TEMPERATURE OF LIQUIDS.

SPECIFICATION forming part of Letters Patent No. 453,422, dated June 2, 1891.

Application filed January 3, 1887. Serial No. 223,299. (No model.)

*To all whom it may concern:*

Be it known that I, HARRY G. CHENEY, of South Manchester, in the county of Hartford and State of Connecticut, have invented certain new and useful Improvements in Apparatus for Maintaining the Temperature of Liquids, of which the following is a full, clear, and exact description, whereby any one skilled in the art can make and use the same.

The object of my invention is to provide an apparatus in which liquids may be maintained at a comparatively uniform temperature for purposes useful in the art of bleaching, dyeing, and in the treatment of animal fibers, and it is particularly applicable to the ungumming of cocoons by the means shown and described in United States patent to H. R. Randall, of February 9, 1886, No. 335,958, although it is obviously not limited in its application to this particular apparatus; and to this end my improvement consists in the combination of a tank, a vat to hold the mass, a system of heating-pipes and a system of circulating-pipes, and in details of the apparatus and its several parts and their combination, as more particularly hereinafter described, and pointed out in the claims.

Referring to the drawings, Figure 1 is a view in elevation of an apparatus embodying my improvements with parts cut away to show the construction. Fig. 2 is a top or plan view of the apparatus with parts cut away to show the construction.

In the accompanying drawings, the letter $a$ denotes a tank, made of any suitable material and adapted to hold a liquid.

$b$ denotes a vat, which may be divided into compartments, making a series $b'$ $b^2$ $b^3$, separated in part by partitions for the purpose of dividing the mass of material into quantities convenient for handling. The steam-pipe $c$, leading from any suitable source of supply, is connected by the riser $c'$ with a coil $d$, arranged within the tank, and from this coil a drip or outlet pipe $c^2$ leads to the main drip $c^3$. Suitable valves $e$ are provided in these pipes for controlling the supply of steam to the coil $d$, by means of which the temperature of a liquid within the tank may be kept at any desired degree. When the liquid has reached the desired temperature, it is drawn off from the tank by means of the faucet $f$, and pours first into the trough $g$, and then through the outlets $g'$ into the several compartments of the vat. This vat is preferably made of wood, with a perforated floor $h$, and with openings $h'$ through the partition-walls between the several compartments of the vat, and below the perforated floor is a space in which a coil of steam-pipe $h^2$ is located, each of the coils $h^2$ being connected with the steam-supply pipe $c$, and with the outlet or drip pipe $c^3$, with stop-valves in the several connections, so that the coils may be used to heat liquid in the vat.

The vat is provided with covers $b^4$, that prevent the waste of heat, and aid in maintaining the liquid at the desired temperature.

The material placed within the vat rests upon the perforated floor, and is thus kept out of contact with the supplemental heating-coils $h^2$ when the latter are used.

When the cubical contents of the tank and of the vat are the same the supplemental heating-coils $h^2$ may be dispensed with; but when the cubical contents of the vat largely exceeds that of the tank the latter heating-coils are used in order to quickly bring the liquid both in the tank and in the vat to the desired temperature. This temperature of the liquid once obtained is maintained, together with the strength of the solution, by causing a circulation of the liquid through the tank and vat and about the coil $d$ by means of the pump $i$ and the circulating system consisting of the suction-pipe $j$ and the delivery-pipe $k$, the former communicating with the vat and drawing therefrom the liquid that flows down through the vat, and the delivery-pipe $k$ pouring the liquid into the tank within which is the main heating-coil.

In ungumming cocoons by the said Randall's process, for use in which the within-described apparatus embodying my improvement is particularly adapted, a mixture of hydrochloric acid and water is used at a temperature below 212° Fahrenheit and at substantially 150° Fahrenheit. The cocoons are placed in the vat, that is then covered over, the liquid is heated, and its temperature maintained by circulating it through the vat and pumping system and the tank with its heating-pipes for a length of time sufficient to accomplish the purpose in hand. By the use of this apparatus this process is applied to larger masses of the cocoons and in a comparatively economical manner.

I claim as my improvement—

1. In an apparatus of the within-described class, in combination, a tank having an inlet for liquid and an outlet controlled by a gate or valve, the heating-pipes located within the tank and connected with a source of steam-supply, the vat located below the level of the tank, and the circulating-pump, with its suction side connected to the vat and the delivery side connected to the tank, all substantially as described.

2. In combination with the tank $a$, having the inlet for liquids, and the outlet $f$, controlled by a gate or valve, the heating-coils $d$, located in the tank, the vat $b$, located below the level of the tank and divided into compartments having the perforated bottoms and the common space beneath the bottoms, the removable covers of the vat, and the pump, with its suction-pipe connected to the vat and its delivery-pipe connected to the tank, whereby a circulation of the liquid may be maintained through the tank and vat, all substantially as described.

3. In combination with the tank $a$, with the steam-coil $d$ located within it, the outlet $f$, the trough $g$, with outlets $g'$, the vat $b$, with its several compartments, the supplemental heating-coils $h^2$, and the pump $i$, with the suction-pipe $j'$ and delivery-pipe $k$, whereby the circulation of the liquid is maintained, all substantially as described.

HARRY G. CHENEY.

Witnesses:
CHAS. L. BURDETT,
H. R. WILLIAMS.